(12) United States Patent
Bozdagi et al.

(10) Patent No.: US 6,493,042 B1
(45) Date of Patent: Dec. 10, 2002

(54) FEATURE BASED HIERARCHICAL VIDEO SEGMENTATION

(75) Inventors: Gozde Bozdagi, Yenisehir (TR); Hong Heather Yu, Plainsboro, NJ (US); Steven J. Harrington, Webster, NY (US); Robert Bryll, Chicago, IL (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/271,869

(22) Filed: Mar. 18, 1999

(51) Int. Cl.[7] .................................................. H04N 5/14
(52) U.S. Cl. ........................................ 348/700; 382/173
(58) Field of Search ................................. 348/699, 700, 348/701, 412.1, 415.1, 722; 382/173, 195, 280; H04N 5/14

(56) References Cited

U.S. PATENT DOCUMENTS 5,635,982 A * 6/1997 Zhang et al. ............... 348/231
5,642,294 A * 6/1997 Taniguchi et al. ......... 364/524 R
5,767,922 A * 6/1998 Zabih et al. ................. 348/700
5,835,163 A * 11/1998 Liou et al. ................... 348/700
5,990,980 A * 11/1999 Golin ......................... 348/700
6,061,471 A * 5/2000 Coleman, Jr. ............... 382/173
6,072,542 A * 6/2000 Wilcox et al. ............... 348/722
6,195,458 B1 * 2/2001 Warnick et al. .............. 382/173

OTHER PUBLICATIONS

H. Yu et al., "Feature–Based Hierarchical Video Segmentation," 1996.

* cited by examiner

*Primary Examiner*—Nhon Diep
(74) *Attorney, Agent, or Firm*—Oliff & Berridge, PLC; Eugene Palazzo

(57) ABSTRACT

Systems and methods for detecting robust fade and dissolve and video sequences. The systems and methods use a two step approach to detect both discontinuous cuts and gradual changes in a video sequence. Specifically, an input video signal is first divided into video segments based on the location of the discontinuous cut. A gradual change detector is then applied to the discontinuous cut segments to determine further cuts based on editing characteristics. By using this two part approach, the systems and methods of this invention can robustly detect scene breaks within a video.

17 Claims, 19 Drawing Sheets

FIG. 4
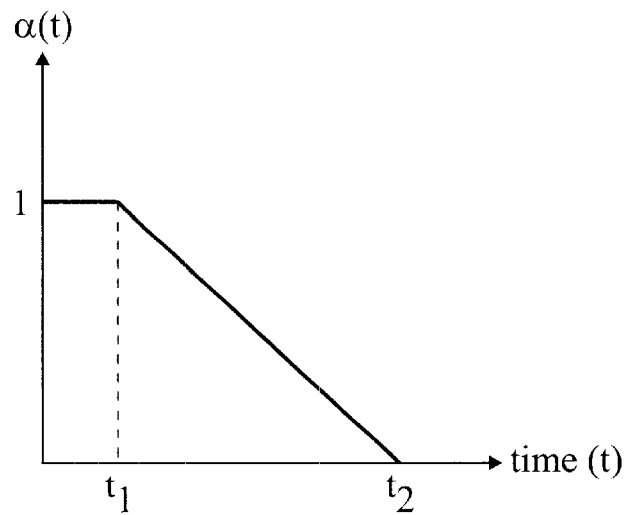
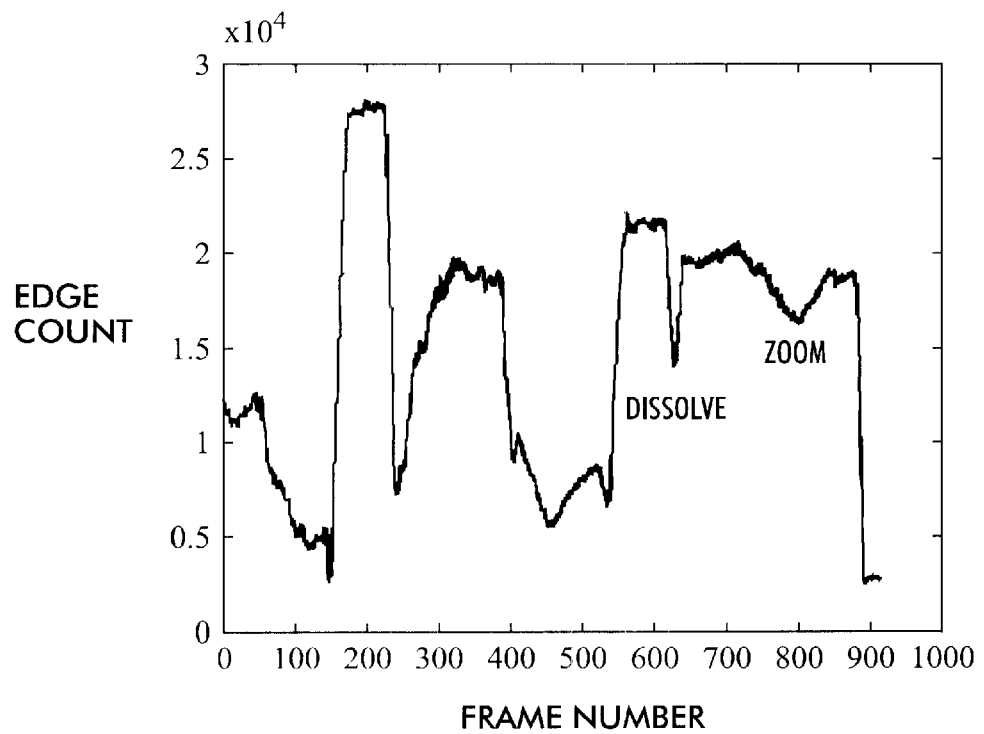
FIG. 5

FIG. 7
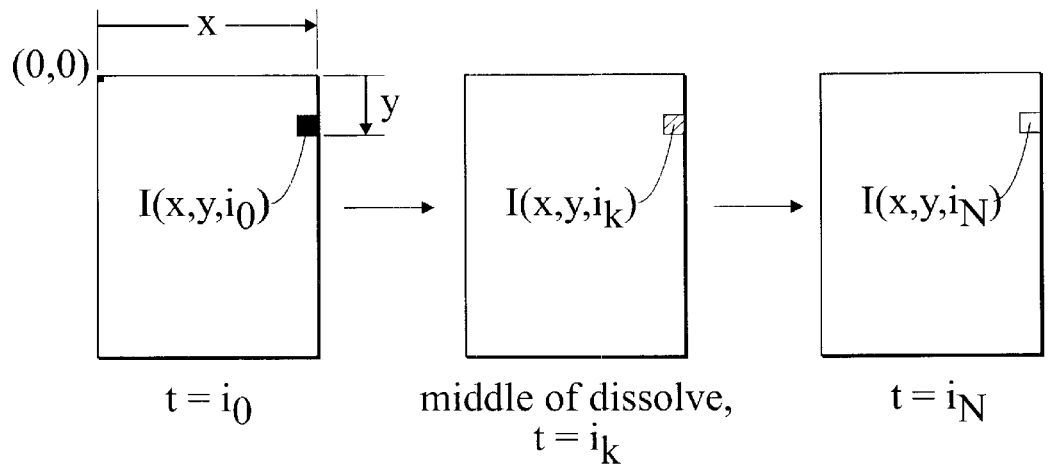
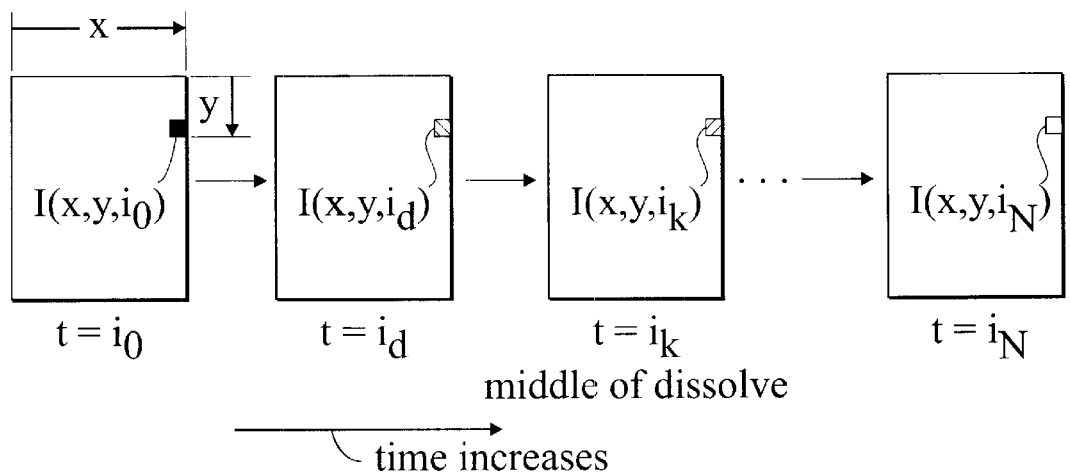
FIG. 8

FIG. 13
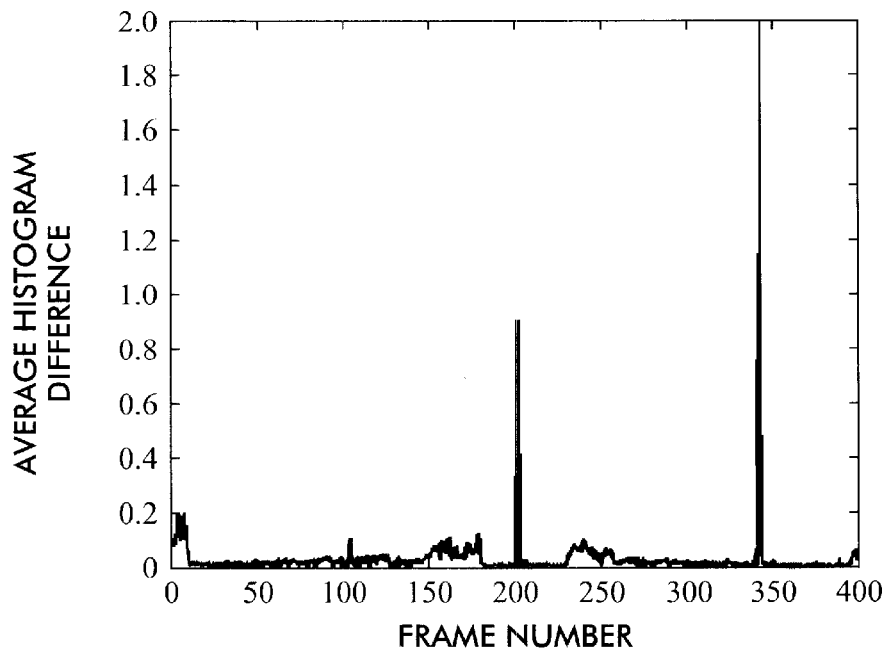
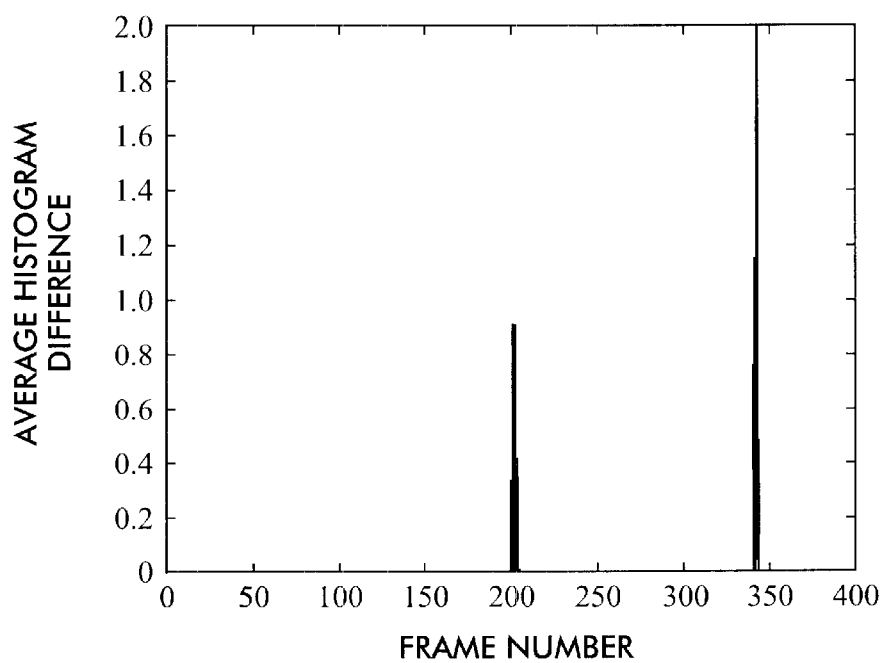
FIG. 14

FEATURE BASED HIERARCHICAL VIDEO SEGMENTATION

BACKGROUND OF THE INVENTION

1. Field of Invention

This invention relates generally to video segmentation. More particularly, this invention is directed towards systems and methods that robustly detect fades and/or dissolves in video sequences.

2. Description of Related Art

Major techniques that have been used in video segmentation can be summarized as histogram comparison, pixelwise intensity comparison, motion-based comparison, compression factor or difference comparison, and edge fraction comparison.

The simplest way to detect whether two frames are significantly different from each other is to compare corresponding pixels in the two frames. The number of pixels in which the difference between that pixel and the spatially corresponding pixel in a second frame is greater than a threshold provides a measure of the distance between the two frames. A major drawback of these methods is their sensitivity to moving objects and movements of the camera. For example, camera panning or a large change in a small area of the frame may yield false detections.

Methods using intensity histograms seem to perform better than these pairwise comparison techniques. There are two basic techniques in this category: global histogram comparison, where a boundary is declared when the difference between histograms of two consecutive frames exceeds a threshold; and local histogram comparison, where a frame is first divided into non-overlapping regions, then the histogram of each individual region is determined. However, these methods can miss cuts when scenes look quite different but have similar distributions.

Motion-based comparison methods are based on the ratio of velocity, i.e., rate of change of motion, to the motion in each frame of the video, and an average interframe correlation coefficient. For motion-based comparison, boundary points are defined as the points where the correlation between frames is low and the ratio of velocity to motion is high.

For a feature-based technique to segment the video, the percentage of edges that enter or exit between the consecutive frames is determined and used to detect the boundaries. However, this technique requires estimating the motion beforehand to align the consecutive frames. The success of the segment detection thus depends on the robustness of the motion estimation technique.

SUMMARY OF THE INVENTION

While these conventional methods provide reasonable results for discontinuous boundaries, they are not robust in detecting boundaries that are due to dissolves, wipes, fade-ins, fade-outs, and continuous cuts.

Video segmentation is a first step towards automatic annotation of digital video sequences. Segmenting the video source involves detecting boundaries between uninterrupted segments of the video, e.g., scene breaks, by evaluating a function $S(I_k, I_{k+1})$ of two consecutive frames $I_k$ and $I_{k+1}$. Within a video sequence, consecutive frames may differ from each other due to object and/or camera movement, lighting changes, gradual changes, e.g., continuous cuts, or abrupt changes, e.g., camera cuts and/or discontinuous cuts.

Any scene change detection method should be sensitive to gradual changes and abrupt changes but should also ignore object and camera movement, as well as lighting changes, as much as possible. One method to achieve this is to perform a large spatial averaging on frame data prior to scene change detection. However, this makes it difficult to detect both the abrupt changes and the gradual changes at the same time.

This invention provides methods and systems that enable feature-based hierarchical video segmentation.

This invention separately provides methods and systems that segment a video.

This invention additionally provides methods and systems that use a two-pass procedure to detect scene breaks in video sequences.

The methods and systems of this invention provide robust systems and methods that detect both continuous and discontinuous cuts simultaneously.

The methods and systems of this invention use a two-pass procedure that detects the camera cuts on low resolution images and detects the gradual changes on high resolution images. For camera cut detection, a histogram comparison technique is used due to its robustness. The gradual changes are detected by examining the frames between the previously-detected discontinuous cuts using an intensity comparison and frame structure technique.

These and other features and advantages of this invention are described in or are apparent from the following detailed description of the preformed embodiments.

BRIEF DESCRIPTION OF THE DRAWINGS

FIG. 4 is an exemplary graph of the dissolved/fade function;

FIG. 5 is an exemplary sequence containing several dissolves and zooms;

FIG. 7 illustrates an exemplary frame in the middle of a dissolve;

FIG. 8 illustrates exemplary frames of a dissolve;

FIG. 13 is an exemplary graph of the histogram difference of the original exemplary video sequence;

FIG. 14 illustrates exemplary detected discontinuous cuts in the exemplary video sequence;

DETAILED DESCRIPTION OF PREFERRED EMBODIMENTS

Figure 1:
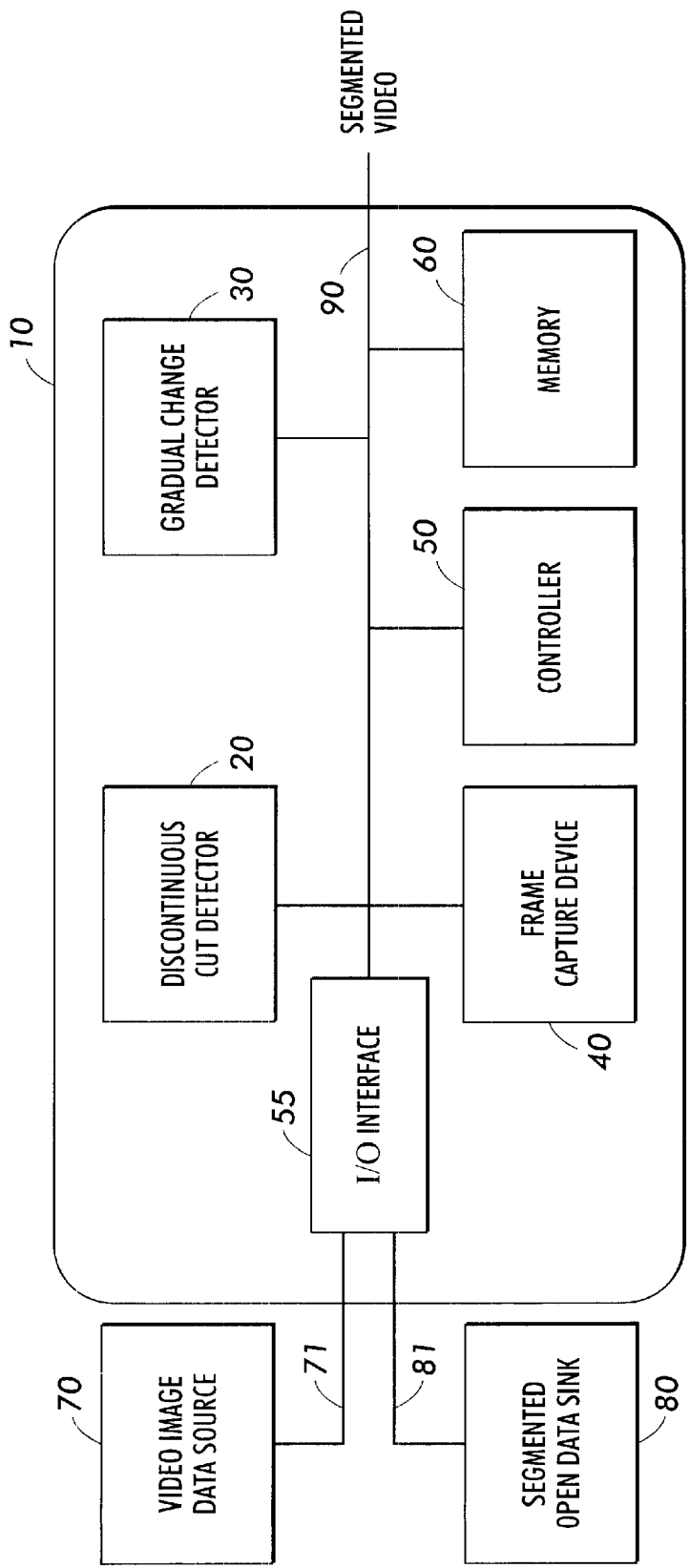
FIG. 1 is a functional block diagram of one embodiment of a video segmenting system.

FIG. 1 shows a video segmenting system 10 according to this invention. The video segmenting system 10 includes a discontinuous cut detector 20, a gradual change detector 30, a frame capture device 40, a controller 50, an I/O interface 55, a data bus 90 and a memory 60. The video segmenting system 10 inputs a video signal from a video data source 70 and outputs a segmented video data signal to a segmented video data sink 80. The segmented video data signal can then be output to, for example, "A Method and System for Real-Time Feature Based Motion Analysis for Key Frame Selection from a Video," filed Dec. 17, 1998, Ser. No. 09/215,594, incorporated herein by reference in its entirety.

The video image data source 70 can be a video camera or any other video image signal source that is capable of providing a video signal to the video segmenting system 10. The video segmenting system 10 is connected to the video image data source 70 that provides video image data, over a signal line or link 71, and to a segmented video data sink 80 that receives the segmented video output by the video segmenting system 10, over a signal line or link 81. In general, the video image data source 70 can be any one of a number of different sources, such as a video recorder, a camcorder, a video cassette player/recorder, a digital video disk player/recorder, or any device suitable for storing and/or transmitting electronic video image data, such as a client or server of a network, such as a cable television network, or the Internet, and especially the World Wide Web.

Thus, the video image data source 70 can be any known or later-developed source that is capable of providing analog or digital video image data to the video segmenting system 10 of this invention. Similarly, the segmented video data sink 80 can be any known or later-developed device that is capable of receiving the segmented video data output by the video segmenting system 10 and either storing, transmitting or displaying the segmented video image data. Thus, the segmented video data sink can be either or both of a channel device for transmitting the segmented video data for display or storage, or a storage device for indefinitely storing the segmented video data until there arises a need to display or further transmit the segmented video data.

The links 71 and 81 can be any known structure or apparatus for transmitting the video image data to or from the video segmenting system 10 to a physically remote or physically collocated storage or display device. Thus, the links 71 and 81 can be a hard-wired link, a wireless link, a public switched telephone network, a local or wide area network, an intranet, the Internet, a wireless transmission channel, any other distributed network, or the like. Similarly, the storage device can be any known structural apparatus for storing the segmented video data, such as RAM, a hard drive and disk, a floppy drive and disk, an optical drive and disk, a flash memory or the like.

The video segmenting system 10 receives the video image data input via the I/O interface 55. A discontinuous cut detector 20, at the direction of the controller 50, detects discontinuous cuts using a histogram comparison technique. The histogram comparison technique is described in detail in "Stored Video Handling Techniques," Y. Tonomura, et al., NTT Review, vol. 5, pp. 82–60, March 1993, herein incorporated by reference in its entirety. However, it should be appreciated that the methods and systems of this invention are not dependent upon this histogram technique. One of ordinary skill in the art will appreciate that any known or later-developed technique can be used to determine the discontinuous cuts in an input video signal and any such technique will work equally well with the methods and systems of this invention.

As previously mentioned, the histogram techniques seem to perform better than the pairwise comparison techniques. However, the drawback of histogram techniques is that they can miss cuts when scenes look different but have similar distributions.

Although the procedures described above give reasonable results for discontinuous boundaries, they are not robust in detecting boundaries that are due to dissolves, wipes, fade-ins and fade-outs. The systems and methods of this invention combine the discontinuous cut detector 20 with the gradual change detector 30 to robustly detect both continuous and discontinuous cuts simultaneously.

Accordingly, the discontinuous cut detector 20, in cooperation with the frame capture device 40, the controller 50 and the memory 60, detects discontinuous cuts.

However, video segments between discontinuous cuts can contain still frames, frames under the effect of gradual transitions, local motion or global motion, such as pans, zooms, and the like. These effects can be successfully detected by the gradual change detector 30.

Furthermore, fade-ins, fade-outs and dissolves are common effects that can be seen in any video production. In a fade-out, the intensity of an image decreases and tends to zero over time. In a fade-in, which begins as a blank frame, an image begins to appear over time. In a dissolve, while one image disappears, another image simultaneously appears. Accordingly, these effects can be manipulated to create a smooth transition between different video segments.

Figure 2:
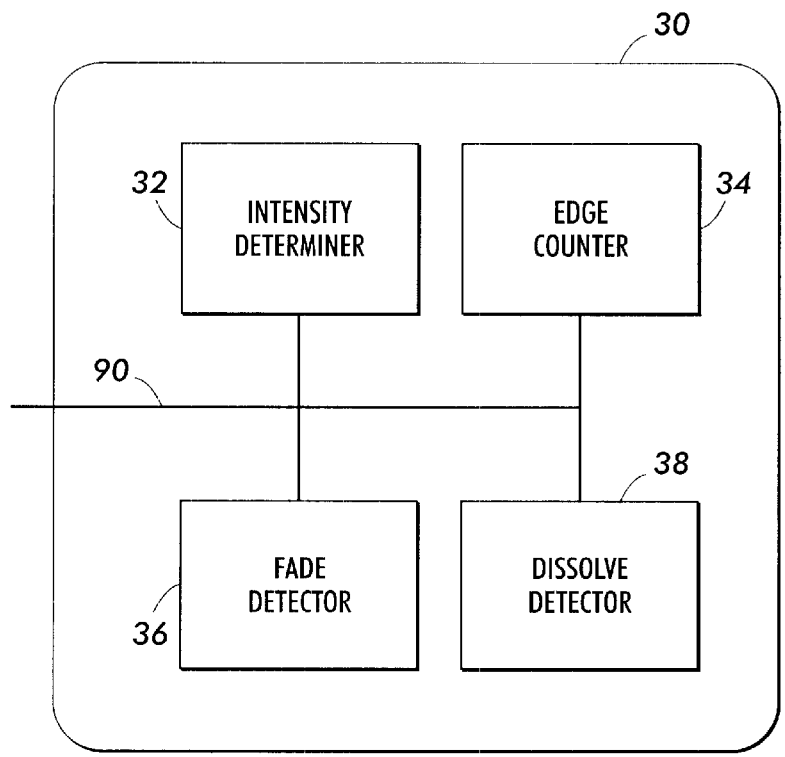
FIG. 2 is a functional block diagram showing in greater detail the gradual change detector of FIG. 1.

FIG. 2 illustrates in greater detail the gradual change detector 30 of FIG. 1. The gradual change detector 30 comprises an intensity determiner 32, an edge counter 34, a fade detector 36 and a dissolve detector 38. The gradual change detector 30 receives, via the data bus 90, video segments that occur between the discontinuous cuts detected by the discontinuous cut detector 20. The intensity determiner 32 determines the intensity of each frame within the discontinuous cut segment.

The edge counter 34 determines the number of edge pixels, i.e., the edge count, in each frame. The edge information within the frame provides information about the structure of the frame. However, the edge count information is insufficient for robust gradual scene break detection.

Accordingly, the fade detector 36, knowing the intensity value characteristics that correspond to edge information of a fade, labels frames with certain threshold edge information as the first and last frames of the fade. Similarly, the dissolve detector 38, in addition to using the edge count information, determines edge count maxima on both sides of the frame with the minimum edge count found by the edge counter 34. The dissolve detector 38 thus determines a double chromatic difference, described in detail below, for all frames between the detected maxima. If the global minimum double chromatic difference is within a certain range, then the segment is a identified as a dissolve.

Figure 3:
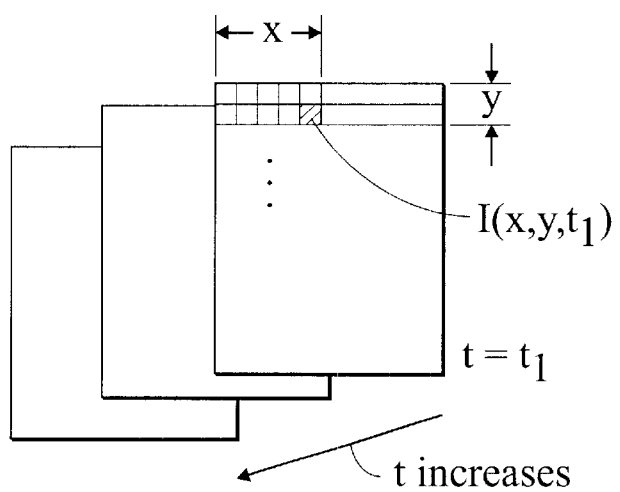
FIG. 3 illustrates an exemplary pixel location.

Detecting gradual changes is based on knowing the characteristics of the gradual changes. Accordingly, to detect gradual changes, the intervals of gradual transitions are extracted and classified. In a fade, the first scene gradually disappears before the second scene gradually appears. In a dissolve, the first scene gradually disappears while, at the same time, the second scene gradually appears. Therefore, with reference to FIG. 3, the intensity within a gradual change at any time (t) can be modeled as $E(x,y,t)$. Specifically, x and y are the coordinates for locating a pixel within a frame, and t indicates the frame in which the pixel occurs. As time t increases, so does the frame number. In particular, the intensity $E(x,y,t)$ for a fade-out at any time t can be modeled as:

$$E(x,y,t)=I(x,y,t_1)\alpha(t)+O(x,y,t_2)[1-\alpha(t)]+B(x,y). \quad (1)$$

In contrast, the intensity $E(x,y,t)$ for a fade-in at any time (t) can be modeled as:

$$E(x,y,t)=O(x,y,t_1)\alpha(t)+I(x,y,t_2)[1-\alpha(t)]+B(x,y); \quad (2)$$

while the intensity $E(x,y,t)$ for a dissolve at time (t) can be modeled as:

$$E(x,y,t)=I(x,y,t_1)\alpha(t)+I(x,y,t_2)[1-\alpha(t)]+B(x,y), \quad (3)$$

where:
- $\alpha(t)$ is a video image data signal value obtained from the corresponding gradual change ramp function;
- $t_1$ and $t_2$ are the starting and ending points of the gradual change;
- $I(x,y,t)$ is the intensity of the pixel at the spatial location (x,y) in the frame occurring at time (t);
- $B(x,y)$ is the intensity value of the pixel at the spatial location (x,y) of any background image, if used, and $$O(x,y,t_1)=O(x,y,t_2)=0 \text{ for all } x,y \quad (4)$$

such that $O(x,y,t)$ shows a black pixel value at the spatial location (x,y) in the frame occurring at time (t).

For example, $\alpha(t)$ can be the decreasing ramp function for a fade-out shown in FIG. 4, with $\alpha(t_1)=1$ and $\alpha(t_2)=0$. The ramp functions for fade-ins and dissolves are similar with the ramp function corresponding to a weighting of the video image data signal intensity based on the temporal location of the frame within the gradual change. For example, the signal intensity level for a fade-in would tend toward a maximum as the fade-in progresses. For a dissolve, with one image fading-in and another image fading-out, a combination of both weightings are used.

The background image B, if used, is an image common to all frames, e.g., text or a label which exists in all frames within a gradual change, such as a station logo in a news program.

In these equations, it should be appreciated that the function $\alpha(t)$ is a blurring function in a temporal direction. Accordingly, the edge information within a frame provides information about the structure of the frame. For example, the edge count as a function of time will have a local minimum during a gradual change. However, as shown in FIG. 5, the edge count may exhibit the same behavior in the case of a zoom, a pan, or a wipe as for a gradual change. Specifically, in FIG. 5, the frames 600–650 are experiencing a dissolve. In contrast, the frames 700–800 are experiencing a zoom. Clearly, the edge count as these two functions occur is similar. So, in addition to the number of edge pixels, the systems and methods of this invention use the principles behind the generation of gradual changes, e.g., a dissolve and/or a fade, for scene break detection.

During a fade, the beginning or end image is a constant, i.e., a single intensity value, image as indicated in Eqs. 1 and 2. Therefore, the number of edge pixels should be close to 0 in these beginning or end images, i.e., existing edges are only due to the background image $B(x,y)$. Furthermore, the number of edge pixels should gradually increase going away from the minimum based on the characteristics of the fade-in or fade-out.

In Eq. 1, the intensity of a pixel in any frame within the gradual change can be determined. Therefore, at the beginning of a fade-out, the intensity of a pixel can be represented by:

$$I(x,y,t_1)+B(x,y). \quad (5)$$

At the end of the fade-out, a black screen remains where all pixel values are zero except for the pixel locations where the background image B exists. These pixel values are given by:

$$O(x,y,t_2)+B(x,y). \quad (6)$$

The same reasoning can be applied to Eqs. 2 and 3. Accordingly, with reference to FIG. 6. the overall method for detecting a fade comprises:
1) Determine the number of edge pixels between a given pair of discontinuous cuts $k_i$ and $k_{i+1}$;
2) Smooth the image of edge pixels to remove or reduce noise;
3) Determine the local minima that are smaller than a given threshold;
4) For each determined local minimum j, find the first local maxima on the left and right hand sides of the determined minimum;
5) Identify the frames corresponding to the located local maxima;
6) Label the identified frames as $i_0$ and $i_N$;
7) Determine the change in edge count between $i_0$ and $i_N$.

Figure 6:
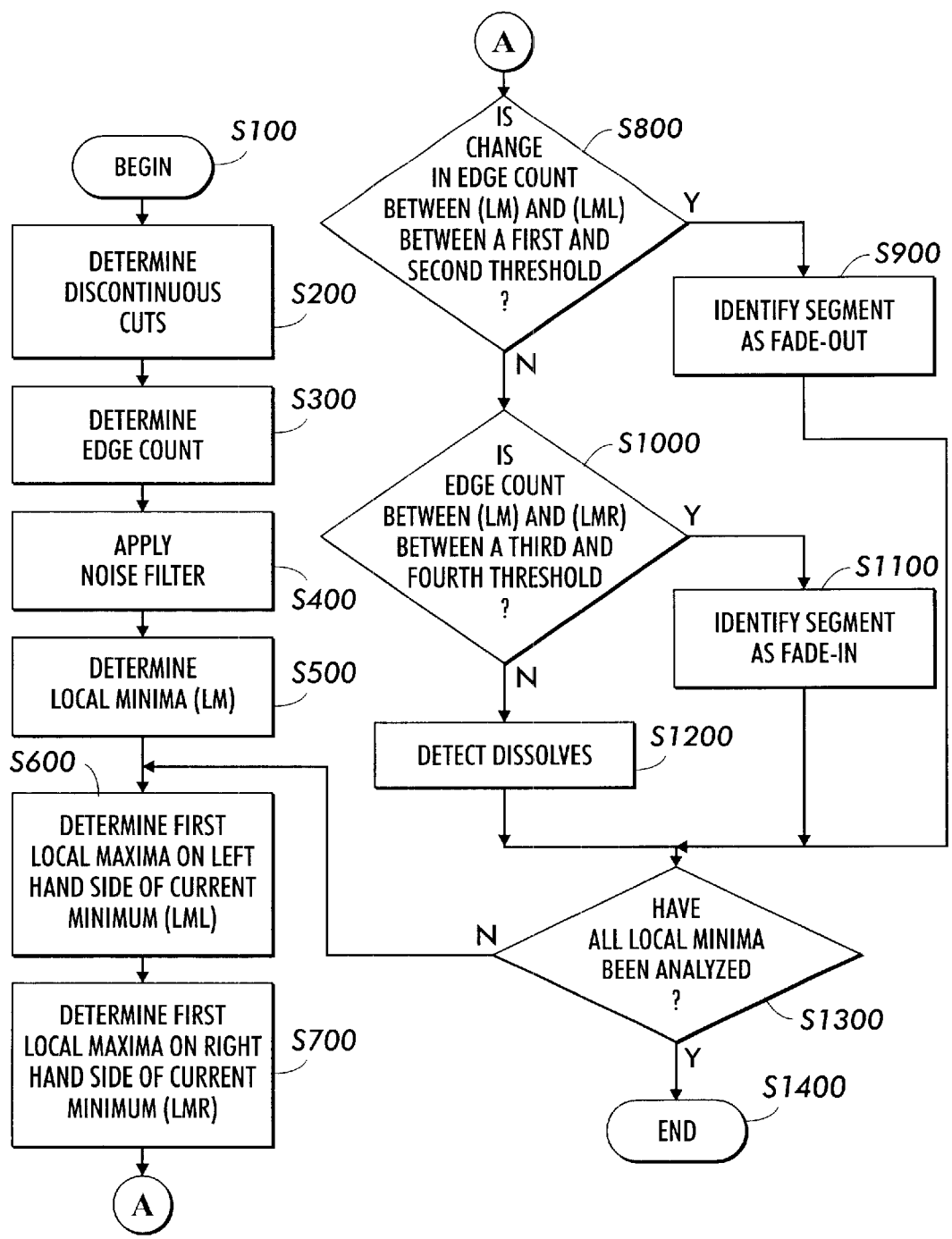
FIG. 6 is an exemplary flowchart outlining one embodiment of a method for identifying segments as fade-in or fade-out in a video signal according to this invention.

FIG. 6 outlines one exemplary embodiment of a method for identifying segments according to this invention. Control begins in step S100. In step S200, the discontinuous cuts are determined. Then, in step S300, the edge counts of the frames between the discontinuous cuts are determined. Next, in step S400, a noise filter is applied to smooth the image of edge pixels between the discontinuous cuts. Control then continues to step S500.

In step S500, the local minima are determined. Next, in step S600, the first local maxima on the left-hand side of a current local minimum is determined. Then, in step S700, the first local maxima on the right-hand side of the current local minimum is determined. Control then continues to step S800.

In step S800, a determination is made whether the change in edge count, EC', is between a first threshold and a second threshold. If the change in edge count EC' is between the first and second thresholds, control continues to step S900. Otherwise, control jumps to step S1000. In step S900, the segment is identified as a fade-out. Control then jumps to step S1300.

In step S1000, a determination is made whether the change in edge count EC' is between a third threshold and a fourth threshold. If the change in edge count EC' is not between the third and fourth thresholds, control jumps to step S1200. Otherwise, control continues to step S1100. In step S1100, the segment is identified as a fade-in. Control then jumps to step S1300.

In step S1200, the segment is analyzed to determine if the segment is a dissolve. Then, in step S1300, a determination is made whether all local minima have been analyzed. If all local minima have not been analyzed, control jumps back to step S600. Otherwise, control continues to step S1400 where the control routine ends.

Therefore, with reference to FIG. 5, if EC'$_i$ is the change in edge count between frames at t=i and t=i+1, the sum of changes for all frames between $i_0$ and j is:

$$\Sigma_{i \Sigma (i_0, j)} EC'_i / (j - i_0) \epsilon (\alpha_1, \alpha_2) \tag{7}$$

where:

$\alpha_1$ and $\alpha_2$ are thresholds;

EC' is the change in edge count; and the segment ($i_0$, j) denotes a fade-out.

The summation is taken for all frames left of the middle frame from, but not including, the frame $i_0$ to, and including, the frame j, i.e., the middle frame of the dissolve.

If the summation is between the thresholds $\alpha_1$ and $\alpha_2$, the segment ($i_0$, j) is a fade-out. From the middle frame to the right of, but not including, the frame $i_N$ on the right hand side of the minimum, the summation is:

$$\Sigma_{i \epsilon (j, i_N)} EC'_i / (i_N - j) \epsilon (\alpha_3, \alpha_4) \tag{8}$$

where:

$\alpha_3$ and $\alpha_4$ are thresholds; and segment [j, $i_N$) denotes a fade-in.

Again, the summation is taken for all frames to the right of the middle frame from, and including, the frame j to, but not including, the frame $i_N$. If the summation is between $\alpha_3$ and $\alpha_4$, then the segment [j, $i_N$) is a fade-in.

To recover any frame within a dissolve using the beginning and end frames, the methods and systems of this invention assume that the local motion is small. However, the same argument is not valid for zoom or pan. With reference to FIG. 8, to detect a dissolve, a comparison of a pixel in the middle frame, e.g., $i_k$, to a pixel in a frame somewhere in the dissolve, e.g., $i_d$, must be performed. Therefore, with reference to FIG. 7, for a dissolve, there is an I(x,y,$i_k$) where $$I(x, y, i_k) = \frac{I(x, y, i_0) + I(x, y, i_N)}{2} \tag{9}$$

where:

$i_0$, $i_k$, and $i_N$ show the beginning, the middle and the end of a dissolve, respectively; and I is the intensity.

Figure 9:
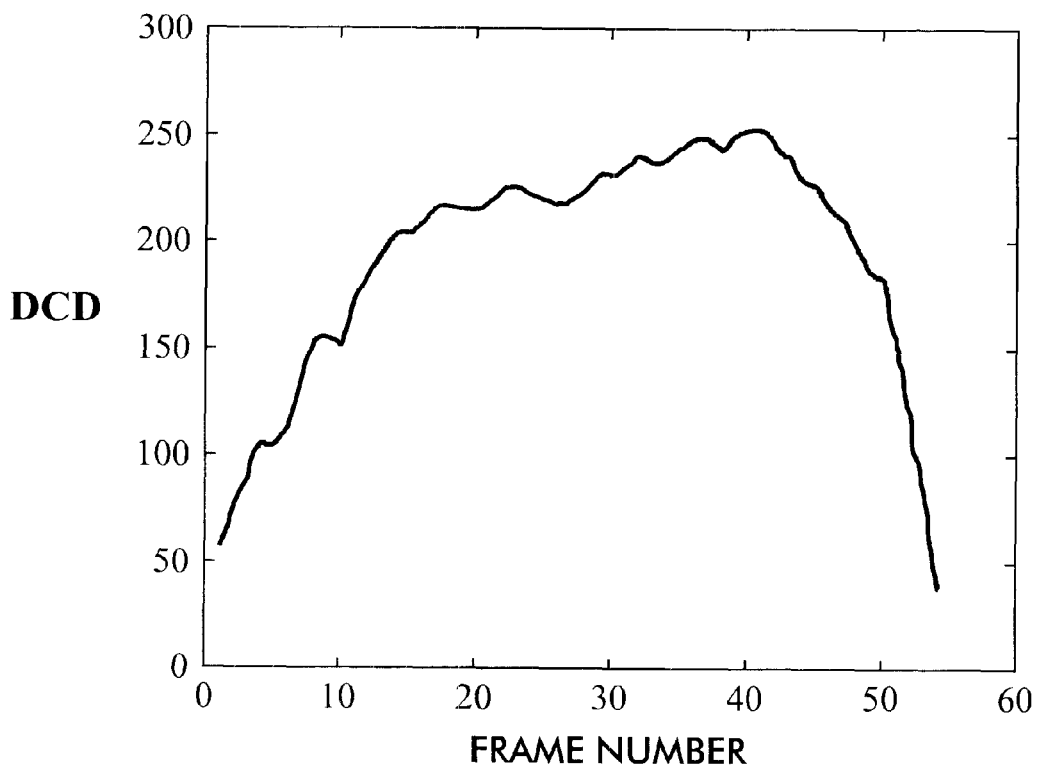
FIG. 9 is an exemplary graph of the double chromatic difference for a zoom.
Figure 10:
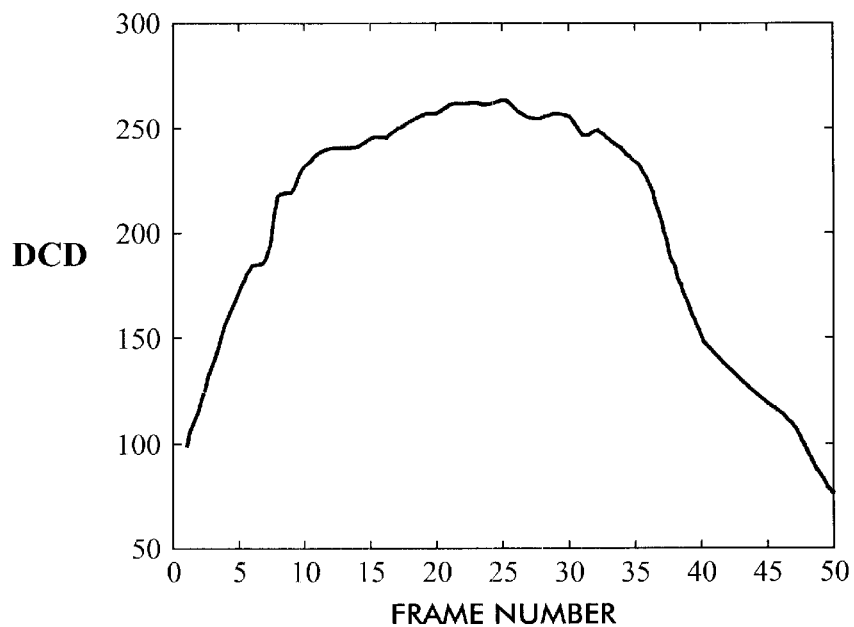
FIG. 10 is an exemplary graph of the double chromatic difference for a pan.
Figure 11:
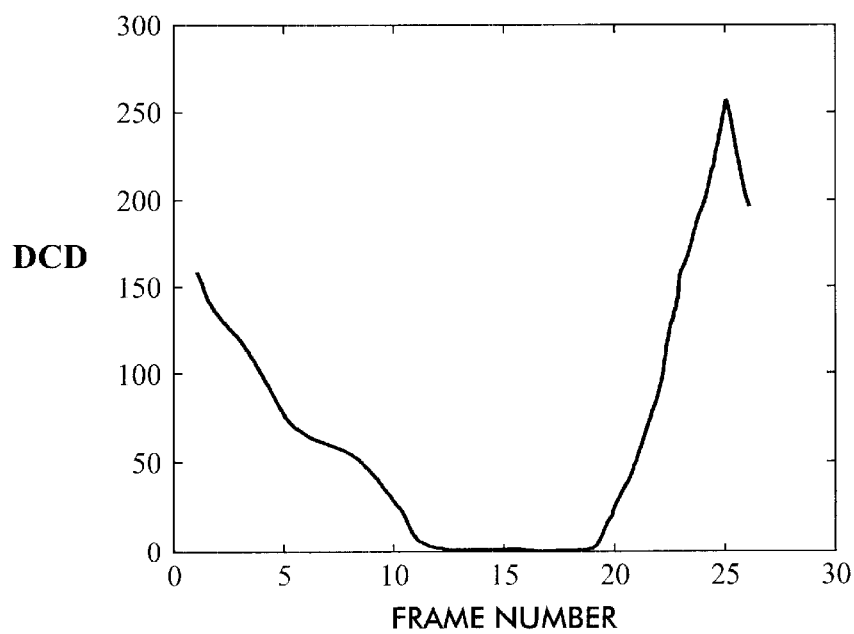
FIG. 11 is an exemplary graph of the double chromatic difference for a dissolve.

Based on this fact, and with reference to FIGS. 9–11 the Double Chromatic Difference (DCD) for a frame not in the middle of the dissolve $i_d$ is:

$$DCD_{i_d} = \sum_{(x,y)} f \left( \left| \frac{I(x, y, i_0) + I(x, y, i_N)}{2} - I(x, y, i_d) \right| \right), \tag{10}$$

where f is a thresholding function.

FIGS. 9–11 show the plot of the double chromatic difference for a frame $i_d$ not in the middle of the sequence. FIG. 9 shows the double chromatic difference for a sequence experiencing a zoom. FIG. 10 shows the double chromatic difference for a sequence experiencing a pan. FIG. 11 shows the double chromatic difference for a sequence experiencing a dissolve.

Figure 12:
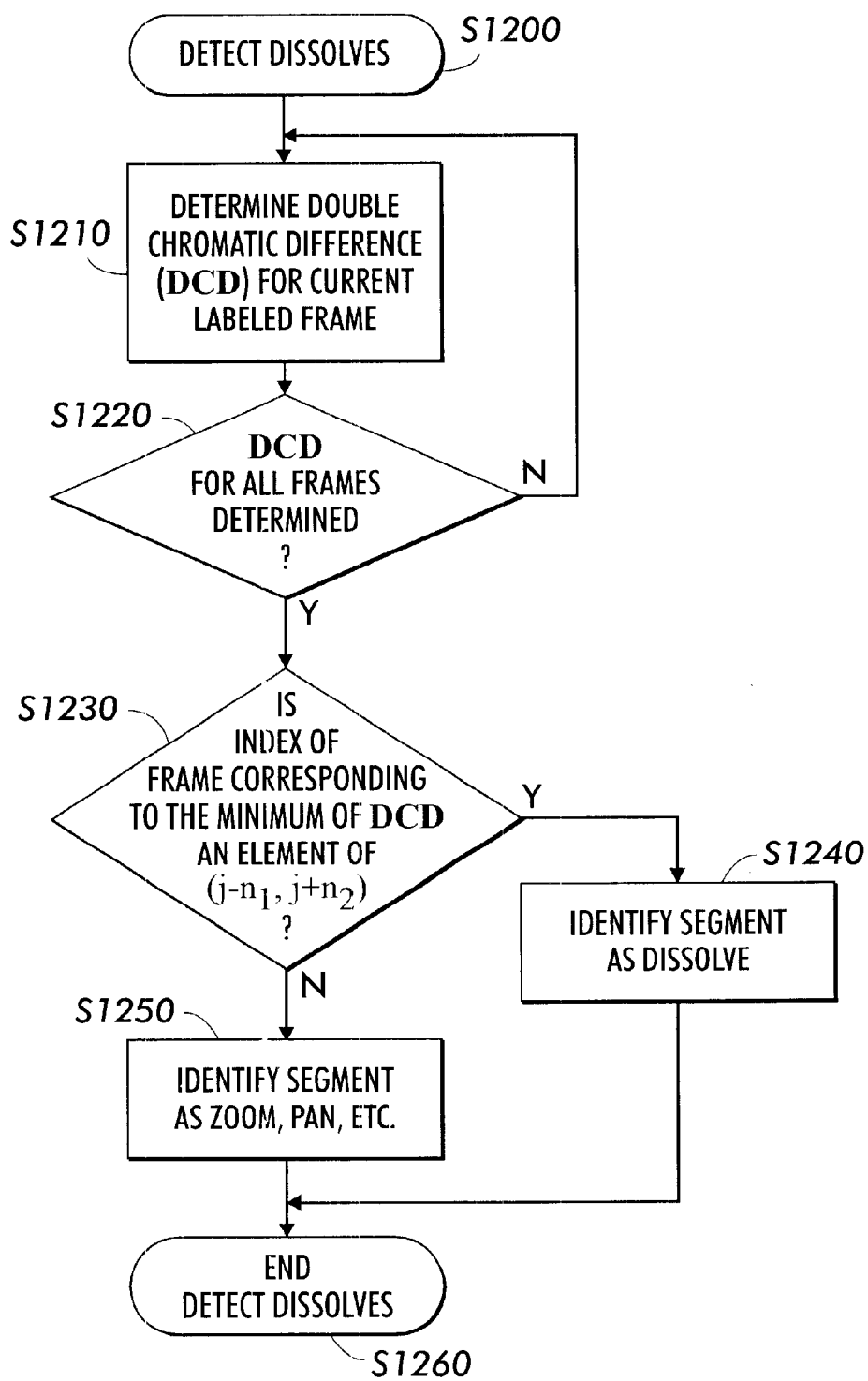
FIG. 12 is an exemplary flowchart outlining one embodiment of a method for detecting a dissolve in a video signal according to this invention.

Thus, with reference to FIG. 12, the overall steps to detect a dissolve are:

1) Determine the edge count between a given pair of discontinuous cuts $k_i$ and $k_{i+1}$;
2) Smooth the image of edge pixels to remove or reduce noise;
3) Find the local minima, i.e., the points indicating the middle of a dissolve;
4) For each local minimum j, find the first local maxima on the left and right hand sides of the minimum and label these frames as $i_0$ and $i_N$;
5) Compute the double chromatic difference (DCD) for each frame between $i_0$ and $i_N$.

The frame number of the frame corresponding to the global minimum of the double chromatic difference is:

$$m_{DCD} \Sigma (j - n_1, j + n_2), \tag{11}$$

where:

$n_1$ and $n_2$ are small integer numbers; and $m_{DCD}$ is the frame number or index of the frame corresponding to the global minimum of the double chromatic difference (DCD). If Eq. 11 is satisfied, then the segment ($i_0$, $i_N$) denotes a dissolve. Otherwise, the segment ($i_0$, $i_N$) it is not a dissolve and this segment could be a zoom, a pan, etc.

Specifically, FIG. 12 illustrates in greater detail one exemplary embodiment of a method for identifying a segment as a dissolve according to this invention.

Beginning in step S1200, control continues to step S1210 where the double chromatic difference for the current labeled frame is determined. Next, in step S1220, a determination is made whether the double chromatic difference for all frames has been determined. If the double chromatic difference has not been determined for all frames, control jumps back to step S1210. Otherwise, control continues to step S1230.

In step S1230, a determination is made whether the index of the frame corresponding to the global minima of the double chromatic difference is an element of (j−$n_1$, j+$n_2$). If the global minima of double chromatic difference is an element of (j−$n_1$, j+$n_2$), control continues to step S1240. Otherwise, control jumps to step S1250.

In step S1240, the segment is identified as a dissolve. Control then jumps to step S1260. In contrast, in step S1250, the segment is identified as a zoom, pan, etc. Control then continues to step S1260 where control returns to step S1300.

Figure 15:
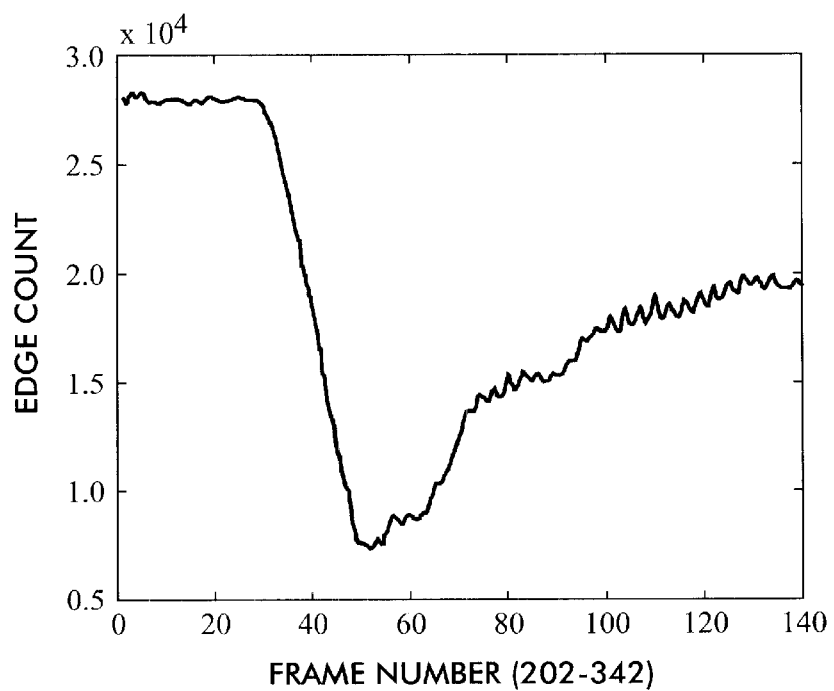
FIG. 15 illustrates an exemplary edge count for the frames between the first and second cuts of FIG. 14.
Figure 16:
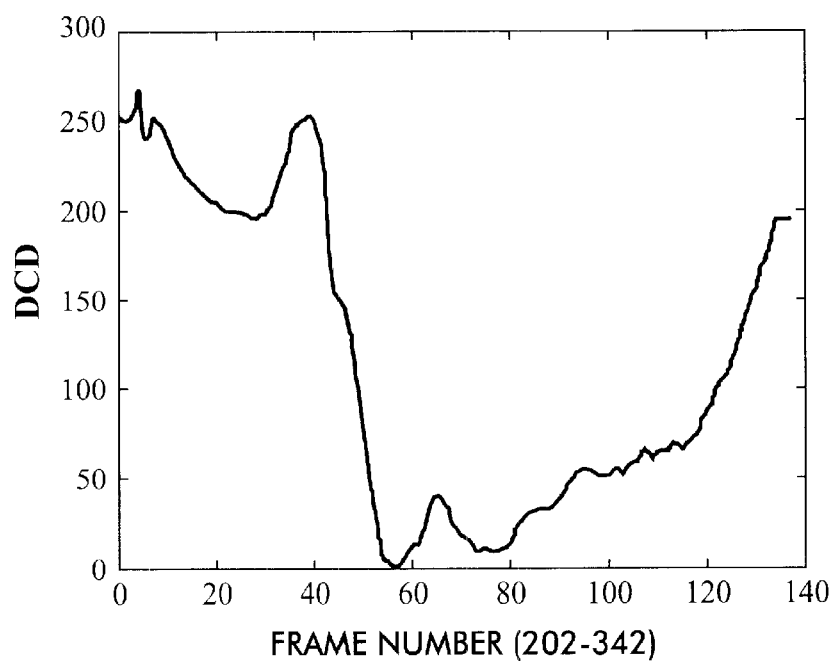
FIG. 16 illustrates an exemplary double chromatic difference for the frames between the first and second cuts of FIG. 14.
Figure 17:
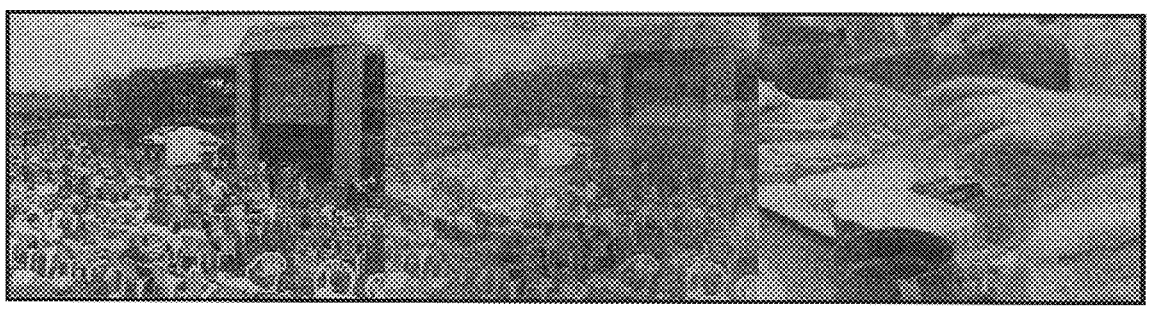
FIG. 17 shows the beginning midpoint and end of the detected dissolve segment.

Testing the dissolve detection method reveals the following results. For an exemplary input recorded news program, FIG. 13 illustrates a plot of the average intensity histogram difference for each frame. The sequence contains discontinuous cuts, continuous cuts and global camera motions. FIG. 14 shows the discontinuous cuts detected on the low resolution image which was obtained by decimating the original image by 4. Specifically, the discontinuous cuts can be seen at frames 200 and 340. FIG. 15 shows the edge count per frame of the frames lying in the region between the first and second detected discontinuous cuts. FIG. 16 shows the double chromatic difference for the region between the first and second detected discontinuous units. Since the graph resembles the double chromatic difference of FIG. 11, the segment is determined to be a dissolve. Therefore, FIG. 17 shows the frames detected as the beginning frame, the end frame and the midpoint frame of the dissolve of the exemplary sequence.

The above-described methods and apparatus detect gradual changes based on edge count and a double chromatic difference determination. This basic concept can be further developed and optimized so that the gradual changes can be detected in near real-time.

Figure 18:
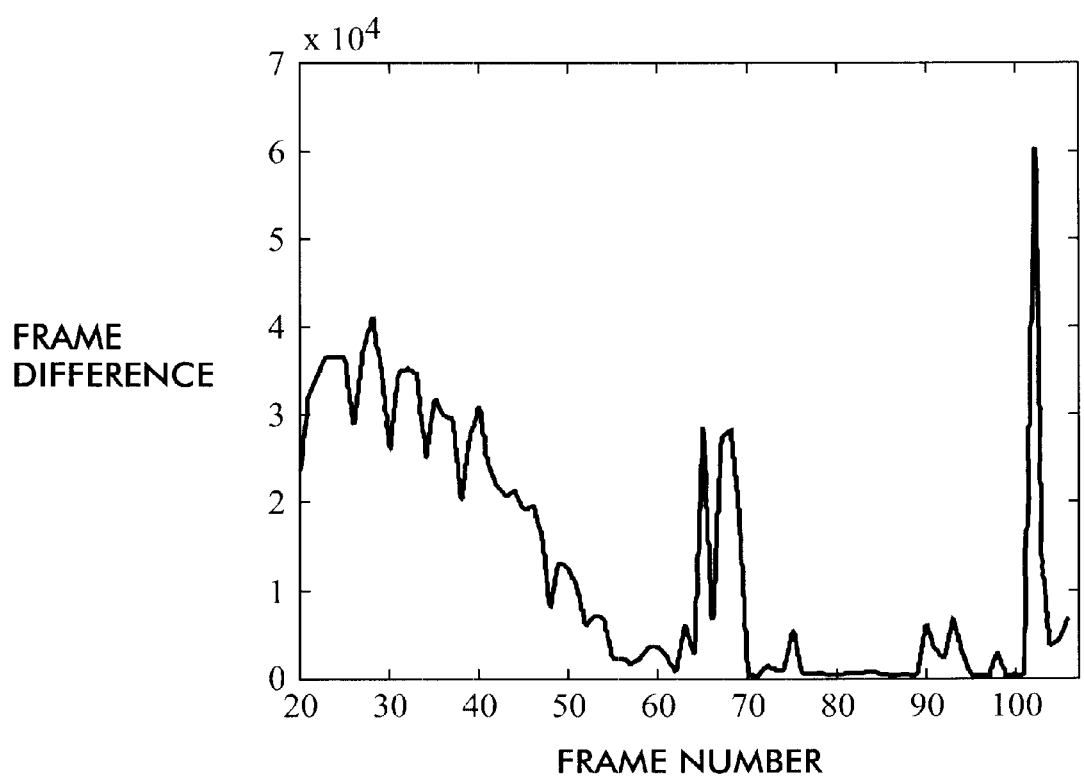
FIG. 18 illustrates an exemplary frame difference plot for a video sequence having dissolves, cuts and global motion.

Specifically, video segmentation is the first step toward automatic annotation of digital video sequences and storyboarding. Any robust video segmentor should be sensitive to both sudden and gradual transitions between frames. A simple difference metric and single threshold are not sufficient for detecting these changes simultaneously. FIG. 18 illustrates the frame difference plotted against the number of frames for a video sequence with sudden transitions, e.g., the frame 103, dissolves, e.g., the frames 60–70, and global motion, e.g., the frames up to the frame 50. In this case, a single threshold would give many false detections of gradual changes. By modifying the above-described approach to depend on global features in the image, such as an average of all pixel intensities, for example, and deviation, such as the difference of pixels from a mean value, rather than local image features, such as edge count, the analysis rate can be increased. Specifically, experimental results illustrate that the video sequence can be processed at a rate of 17 frames per second using this optimized approach.

Figure 19:
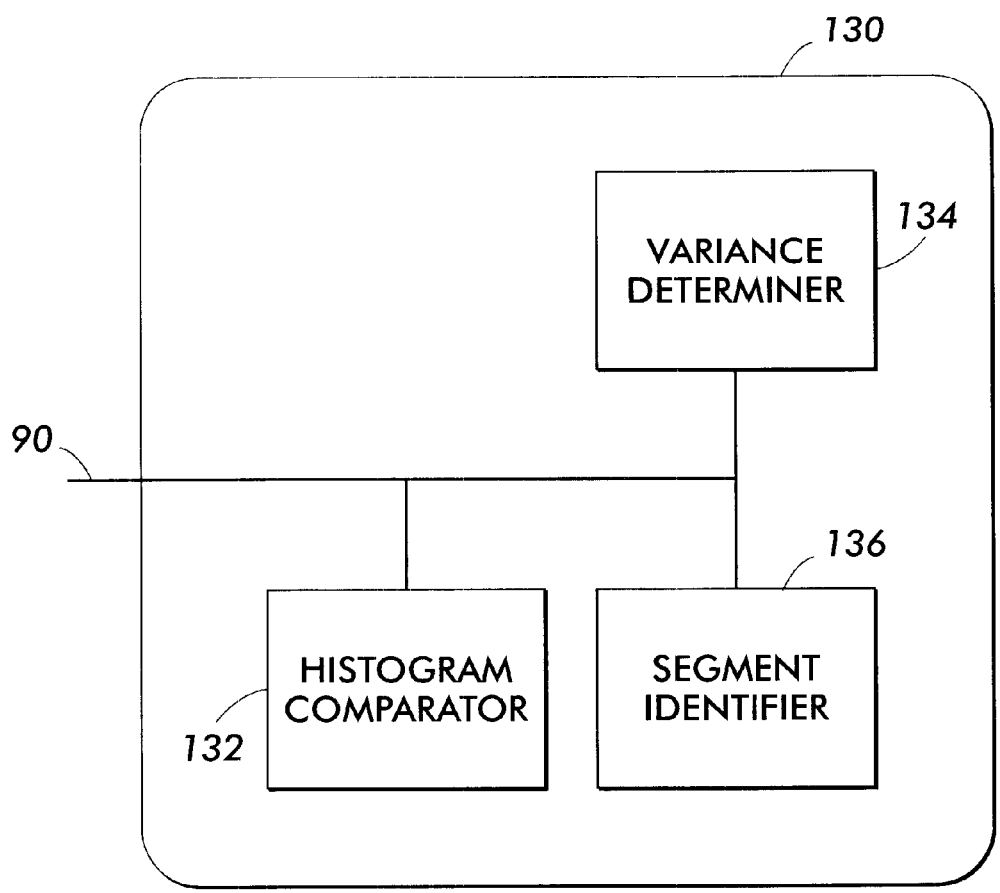
FIG. 19 is a functional block diagram of a second exemplary embodiment of the gradual change detector according to this invention.

FIG. 19 illustrates a second embodiment of the gradual change detector 130 that is optimized to detect gradual changes in real-time. The optimized gradual change detector 130 comprises a histogram comparor 132, a variance determiner 134 and a segment identifier 136. The optimized gradual change detector 130 receives, via the data bus 90, video segments that occur between the discontinuous cuts detected by the discontinuous cut detector 20. The histogram comparor 132 generates a histogram of all frames within the video segment defined by the detected discontinuous cuts. The variance determiner 134 then determines the rate of increase/decrease of the variance between each frame. Based on this determined rate of increase/decrease of the variance and the histogram values, segment identifier 136 then identifies the segment as a fade or dissolve.

As previously discussed, the intensity $E(x,y,t)$, for a dissolve at time (t) can be modeled as:

$$E(x,y,t)=I(x,y,t_1)\alpha(t)+I(x,y,t_2)[1-\alpha(t)]+B(x,y), \quad (12)$$

where
$I(x,y,t_1)=0$ in the case of fade-in;
$I(x,y,t_2)=0$ in the case of a fade-out; and
$t_1$ and $t_2$ are the starting and ending points of the gradual change;
$\alpha(t)$ is a video image data signal value intensity function, i.e., ramp function, based on the temporal location of a frame within the gradual change; and $B(x,y)$ is the intensity value of the pixel at (x,y) of the background image B. A simple linear representation for the ramp function $\alpha(t)$ can be expressed as:

$$\alpha(t)=(t-t_2)/(t_1-t_2), \quad (13)$$

Combining Eqs. 12 and 13, the quadratic function, for the variance, i.e., intensity deviation, of any frame within a gradual change is:

$$\text{Variance}=(At-B)^2+C, \quad (14)$$

where A, B and C are functions of $I(x,y,t_1)$, $I(x,y,t_2)$, and $B(x,y)$, respectively, as well as $t_1$ and $t_2$.

Figure 20:
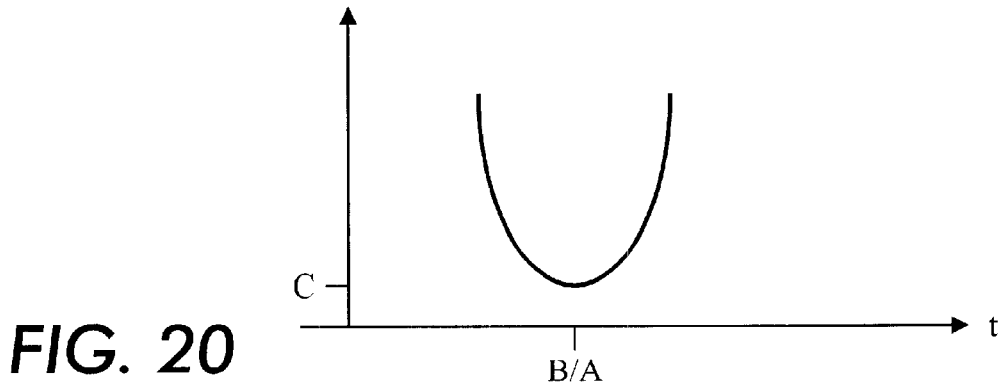
FIG. 20 illustrates an exemplary plot of the variance versus frame number.
Figure 21:
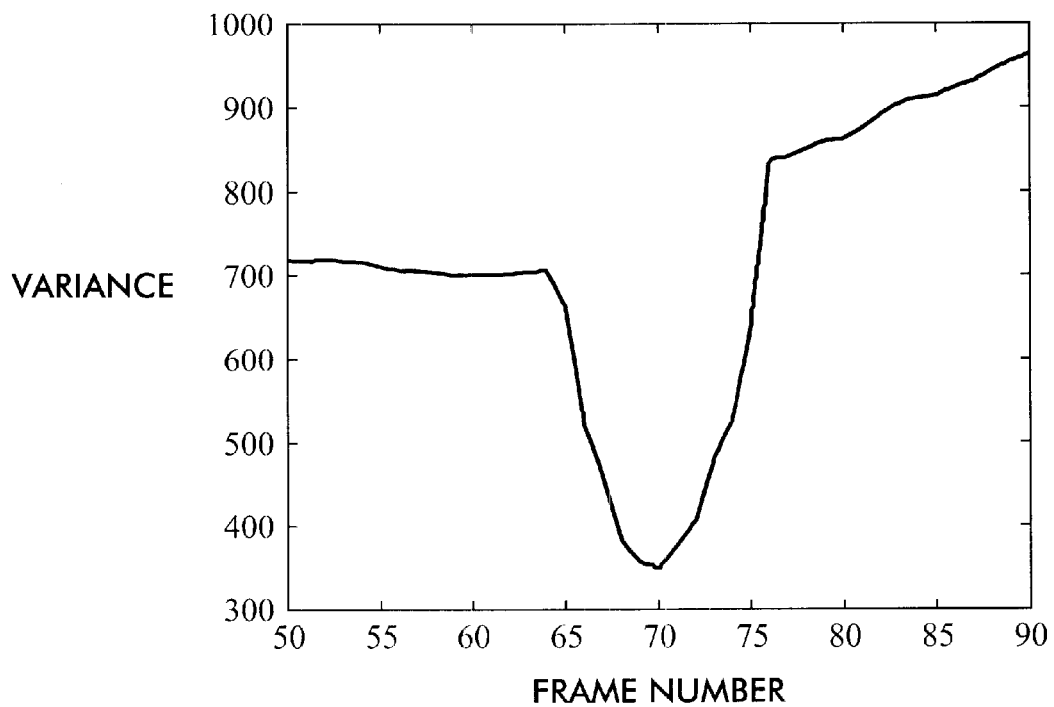
FIG. 21 illustrates an exemplary plot of the variance for a video sequence having a dissolve.

FIG. 20 illustrates the variance has a minimum C, which corresponds to the background at time=B/A, corresponding to the point where the intensity distribution of the pixels is almost uniform, i.e., the beginning of fade-in, the end of fade-out, or the middle of dissolve. FIG. 21 shows the variance plot for an exemplary video segment containing a dissolve, where the dissolve occurs between the frames 64 and 83.

Figure 22:
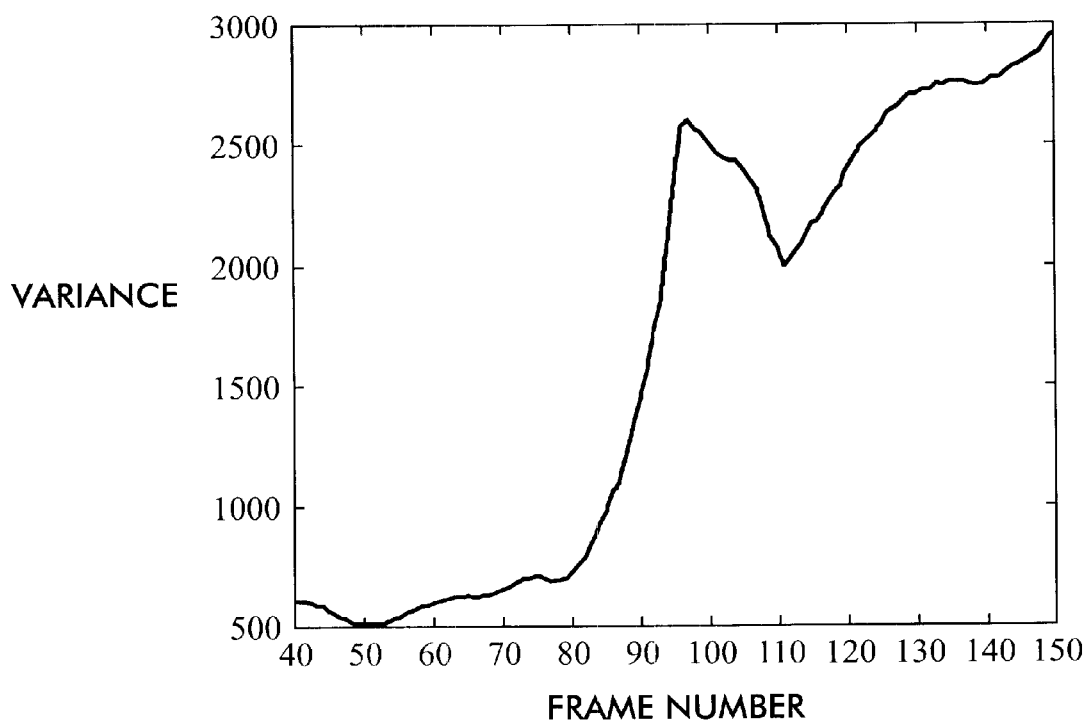
FIG. 22 illustrates an exemplary plot of the variance for a video sequence having a dissolve and having local motion.

Looking at FIGS. 20 and 21, the gradual change or local minimum can easily be detected using the variance plot. However, as seen in FIG. 22, the variance plot may exhibit a similar behavior in case of global or a strong local motion. For example, in FIG. 22 there is a dissolve between the frames 75–97 and a strong local movement between the frames 100–130.

To filter the false gradual change detections corresponding to the local/global motion, the rate of increase or decrease of the variance is determined. If the rate of increase or decrease of the variance curve is greater than a predefined threshold, the histograms of the frames at the beginning and end of the detected region are checked. If the difference between the histograms are also greater than a predefined threshold, the region is marked as a region under the effect of dissolve.

Figure 23:
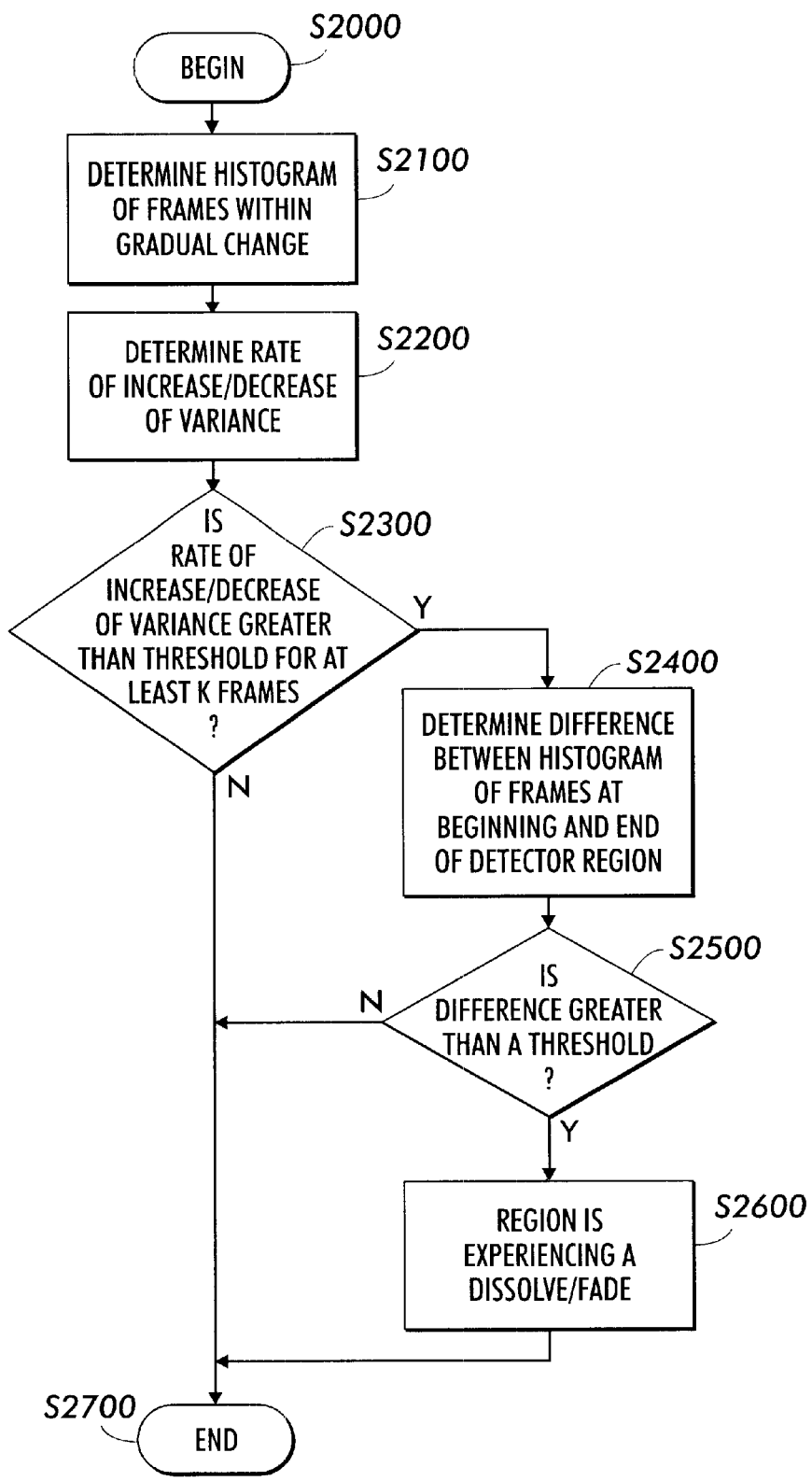
FIG. 23 is a second exemplary flowchart outlining one embodiment of a method for real-time detection of a dissolve in a video signal according to this invention.

FIG. 23 illustrates an exemplary method of detecting both sudden and gradual transitions between frames simultaneously. Control begins in step S2000. In step S2100, the histograms of all frames within a gradual change are determined. Next, in step S2200, the rate of increase or decrease of the variance is determined for these frames. Then, in step S2300, a determination is made whether the rate of increase or decrease of the variance is greater than a predetermined threshold for at least a K number of frames. For example, K was arbitrarily set to 7 in the working model. Seven frames were found to be sufficient to eliminate spurious sudden changes. However, it should be appreciated that any number of frames that maximizes accuracy can be selected. If the rate of increase or decrease of the variance is less than a threshold, control jumps to step S2700. Otherwise, control continues to step S2400.

In step S2400, the difference between the histogram for the frames at the beginning and the end of the detected region is determined. Next, in step S2500, a determination is made whether the histogram difference of these end frames is larger than a threshold. If the histogram difference is greater than the threshold, control continues to step S2600. Otherwise, control jumps to step S2700. In step S2600, the segment is labeled as experiencing a dissolve. Control then continues to step S2700. In step S2700, the control sequence ends.

Figure 24:
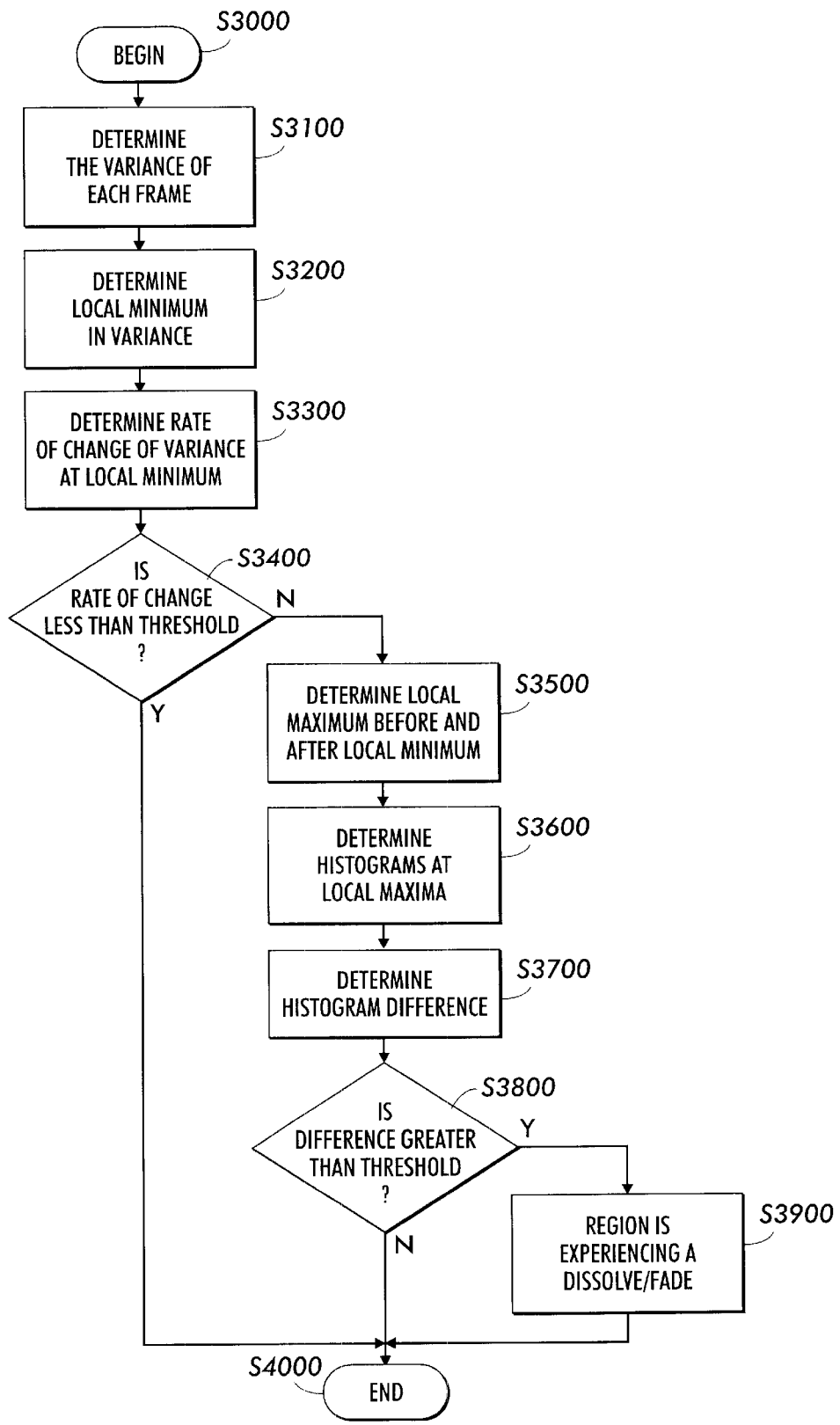
FIG. 24 is a second exemplary flowchart outlining one embodiment of a method for real-time detection of a dissolve in a video signal according to this invention.

FIG. 24 illustrates a second exemplary embodiment of the method for detecting gradual transitions between frames simultaneously. Control begins in step S3000. In step S3100, the variance of each frame is determined. Next, in step S3200, the local minimum of the variance is determined. Then, in step S3300, the rate of change of variance at the local minimum is determined. Control then continues to step S3400.

In step S3400, a determination is made whether the rate of change is less than a first threshold. If the rate of change is less than the first threshold, control jumps to step S4000. Otherwise, control continues to step S3500.

In step S3500, the local maximum before the local minimum and the local maximum after the local minimum are determined. Next, in step S3600, the histograms at the local maxima are determined. Then, in step S3700, the histogram difference between the histograms determined for the local maxima is determined. Control then continues to step S3800.

In step S3800, a determination is made whether the difference is greater than a second threshold. If the difference is not greater than a second threshold, control jumps to step S4000, where the control sequence ends. Otherwise, control continues to step S3900. In step S3900, the region is identified as experiencing a dissolve/fade. Control then continues to step S4000 where the control sequence ends.

Figure 25:
FIG. 25 illustrates the detected dissolves and cuts from an exemplary video sequence.
Figure 26:
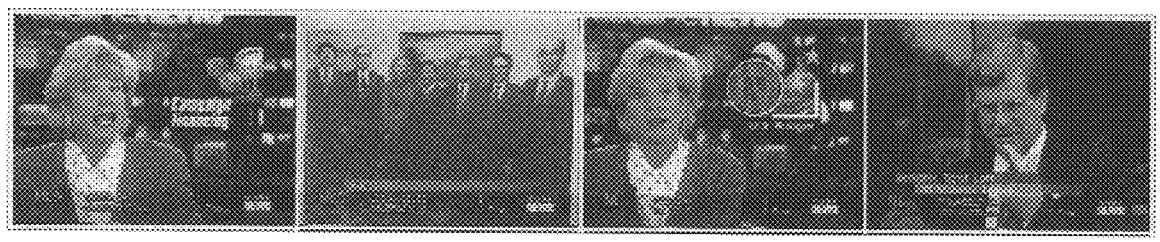
FIG. 26 illustrates the cuts detected from the sequence shown in FIG. 17.

FIG. 25 shows the dissolves detected from an exemplary video sequence with several sudden changes, global motion and dissolves. FIG. 26 illustrates all the cuts detected from the same sequence to demonstrate the performance of the method.

As shown in FIGS. 1–2 and 19, the systems and methods for performing feature-based video segmentation are preferably implemented on a programmed general purpose computer. However, the systems and methods for performing feature-based video segmentation can also be implemented on a special purpose computer, a programmed microprocessor or microcontroller and peripheral integrated circuit elements, an ASIC or other integrated circuit, a digital signal processor, a hard wired electronic or logic circuit such as a discrete element circuit, a programmable logic device such as a PLD, PLA, FPGA or PAL, or the like. In general, any device which is capable of implementing the finite state machine that is in turn capable of implementing the flowcharts shown in FIGS. 6, 12, 23 and 24 can be used to implement the system for video segmentation.

While this invention has been described in conjunction with preferred embodiments thereof, it is evident that many alternatives, modifications and variations be apparent to those skilled in the art.

What is claimed is:

1. A video segmentation system that detects gradual changes between discontinuous cuts, comprising:
    a histogram determiner that determines a histogram of at least two frames between a pair of discontinuous cuts of a video segment;
    a variance determiner that determines a variance between the at least two frames; and
    a segment identifier that identifies a gradual change based on the variance between the at least two frames, wherein the histogram is determined from an intensity of the at least two frames and the intensity E(x,y,t) at time (t) is:

$$E(x,y,t)=I(x,y,t_1)\alpha(t)+I(x,y,t_2)[1-\alpha(t)],$$

where
        $I(x,y,t_1)$ is the intensity of a pixel at the spatial location (x,y) in the frame occurring at time (t);
        $I(x,y,t_1)=0$ in the case of fade-in;
        $I(x,y,t_2)=0$ in the case of a fade-out;
        $t_1$ and $t_2$ are the starting and ending points of the video segment; and
        $\alpha(t)$ is a video image data signal value intensity function based on the temporal location of a frame within the gradual change.

2. The intensity E(x,y,t) of claim 1, further comprising a background image B(x,y), such that $$E(x,y,t)=I(x,y,t_1)\alpha(t)+I(x,y,t_2)[1-\alpha(t)]+B(x,y),$$

where B(x,y) is the intensity value of the pixel at the spatial location (x,y) of the background image B.

3. The video segmentation system of claim 1, wherein $\alpha(t)$ is a ramp function.

4. The video segmentation system of claim 3, wherein the ramp function $\alpha(t)$ is:

$$\alpha(t)=(t-t_2)/(t_1-t_2).$$

5. The video segmentation system of claim 4, wherein the variance of any frame within the video segment is:

$$\text{Variance}=(At-B)^2+C,$$

where A, B and C are functions of $I(x,y,t_1)$, $I(x,y,t_2)$, and B(x,y), respectively, and $t_1$ and $t_2$.

6. A video segmentation system that detects gradual changes between discontinuous cuts, comprising:
    a histogram determiner that determines a histogram of at least two frames between a pair of discontinuous cuts of a video segment;
    a variance determiner that determines a variance between the at least two frames; and
    a segment identifier that identifies a gradual change based on the variance between the at least two frames and that determines a difference between a frame at a beginning and a frame at an end of the gradual change, wherein the histogram is determined from an intensity of the at least two frames.

7. The video segmentation system of claim 6, wherein the gradual change is identified as a fade if the difference between the frame at the beginning and the frame at the end of the gradual change is greater than a threshold.

8. The video segmentation system of claim 6, wherein the gradual change is identified as a dissolve if the difference between the frame at the beginning and the frame at the end of the gradual change is greater than a threshold.

9. A method for detecting a gradual change in a video segment comprising:
    determining a histogram for at least two frames between discontinuous cuts of a video segment;
    determining a variance between the at least two frames in the histogram;
    comparing the variance to a threshold;
    determining, if the variance is greater than a threshold, that the video segment is experiencing a gradual change;
    locating a frame at a beginning of the gradual change and a frame at an end of the gradual change; and
    determining a difference between a histogram of the frame at the beginning of the gradual change and a histogram of the frame at the end of the gradual change.

10. The method of claim 9, further comprising:
    comparing the difference of the histogram of the frame at the beginning of the gradual change to the histogram of frame at the end of the gradual change; and determining, if the difference exceeds a threshold, that the video segment is experiencing a fade.

11. The method of claim 9, further comprising:

comparing the difference of the histogram of the frame at the beginning of the gradual change to the histogram of frame at the end of the gradual change; and determining, if the difference exceeds a threshold, that the video segment is experiencing a dissolve.

12. A method of detecting segments separated by gradual transitions within a video segment comprising:

determining an average variance for at least one representative frame in the video segment;

detecting at least one candidate transition based on the average variance by identifying when the average variance has a local minimum; and verifying the at least one candidate transition.

13. A method of detecting segments separated by gradual transitions within a video segment comprising:

determining an average variance for at least one representative frame in the video segment;

detecting at least one candidate transition based on the average variance; and verifying the at least one candidate transition by checking a rate of change of the variance at the candidate transition.

14. The method of claim 13, wherein checking the rate of change comprises:

comparing an absolute rate of change of the average variance to a threshold; and determining, if the average variance is below a threshold, that the segment is experiencing a transition.

15. The method of claim 13, wherein checking the rate of change comprises:

checking if an absolute rate of change of the average variance is above a threshold.

16. The method of claim 15, wherein checking if the absolute rate of change is above the threshold comprises:

determining a frame at a beginning of a candidate transition region and a frame at an end of the candidate transition region;

calculating an intensity histogram for each of the determined beginning and end frames;

finding an overall difference between the calculated intensity histograms; and verifying, if the overall histogram difference exceeds a threshold, that the candidate transition is a transition.

17. The method of claim 16, wherein the beginning frame and the end frame are determined as the frames with a local maximum in the average variance closest in time before and after the candidate frame.

* * * * *